(12) United States Patent
Sun et al.

(10) Patent No.: US 12,435,397 B2
(45) Date of Patent: Oct. 7, 2025

(54) AB2 TYPE-BASED HYDROGEN STORAGE ALLOYS, METHODS OF PREPARATION AND USES THEREOF

(71) Applicant: GRZ TECHNOLOGIES SA, Avenches (CH)

(72) Inventors: Tai Sun, Laupen (CH); Noris Gallandat, Schwarzsee (CH)

(73) Assignee: GRZ TECHNOLOGIES SA, Avenches (CH)

( * ) Notice: Subject to any disclaimer, the term of this patent is extended or adjusted under 35 U.S.C. 154(b) by 0 days.

(21) Appl. No.: 18/681,104

(22) PCT Filed: Aug. 2, 2022

(86) PCT No.: PCT/EP2022/071620
§ 371 (c)(1),
(2) Date: Feb. 5, 2024

(87) PCT Pub. No.: WO2023/012135
PCT Pub. Date: Feb. 9, 2023

(65) Prior Publication Data
US 2024/0263284 A1      Aug. 8, 2024

(30) Foreign Application Priority Data
Aug. 3, 2021    (EP) ..................... 21189513

(51) Int. Cl.
| | | |
|---|---|---|
| C22C 30/02 | (2006.01) |
| B22F 1/05 | (2022.01) |
| B22F 1/068 | (2022.01) |
| B22F 9/08 | (2006.01) |

(Continued)

(52) U.S. Cl.
CPC ............... *C22C 30/02* (2013.01); *B22F 1/05* (2022.01); *B22F 1/068* (2022.01); *B22F 9/08* (2013.01); *C01B 3/0057* (2013.01); *C22C 1/02* (2013.01); *B22F 2304/15* (2013.01); *B22F 2998/10* (2013.01); *B22F 2999/00* (2013.01); *C22C 2202/04* (2013.01)

(58) Field of Classification Search
None
See application file for complete search history.

(56) References Cited

U.S. PATENT DOCUMENTS

| | | | |
|---|---|---|---|
| 4,228,145 | A | 10/1980 | Gamo et al. |
| 4,849,205 | A | 7/1989 | Hong |
| 2004/0206424 | A1 | 10/2004 | Stetson et al. |

(Continued)

FOREIGN PATENT DOCUMENTS

| | | |
|---|---|---|
| CN | 1602366 | 3/2005 |
| CN | 1789455 | 6/2006 |

(Continued)

OTHER PUBLICATIONS

Written Opinion in International Application No. PCT/EP2022/071620, Nov. 24, 2022, pp. 1-9.

(Continued)

*Primary Examiner* — Xiaobei Wang
(74) *Attorney, Agent, or Firm* — SALIWANCHIK, LLOYD & EISENSCHENK

(57) ABSTRACT

The invention relates to metal hydrides for storing hydrogen, in particular AB2 based metal hydrides, methods of production and uses thereof.

11 Claims, 6 Drawing Sheets

(51) Int. Cl.
  *C01B 3/00*   (2006.01)
  *C22C 1/02*   (2006.01)

(56) References Cited

U.S. PATENT DOCUMENTS

2022/0227623 A1\*  7/2022  Lin ..................... C22C 1/0458
2024/0279052 A1    8/2024  Sun et al.

FOREIGN PATENT DOCUMENTS

| CN | 100335665 | | 9/2007 |
|---|---|---|---|
| CN | 109609791 | B | 11/2020 |
| JP | H01165737 | | 6/1989 |
| JP | H0873970 | | 3/1996 |
| WO | WO 03/054240 | | 7/2003 |
| WO | WO 2015/189758 | | 12/2015 |
| WO | WO-2023153207 | A1 \* | 8/2023 |

OTHER PUBLICATIONS

International Preliminary Report on Patentability in International Application No. PCT/EP2022/071620, Feb. 15, 2023, pp. 1-10.
Hirscher, M. et al. "Materials for hydrogen-based energy storage—past, recent progress and future outlook" *Journal of Alloys and Compounds,* available online Dec. 31, 2019, pp. 1-39, vol. 827.
Sakintuna, B. et al. "Metal hydride materials for solid hydrogen storage: A review" *International Journal of Hydrogen Energy,* available online Jan. 16, 2007, pp. 1121-1140, vol. 32, No. 9.
Bellosta Von Colbe, J. et al. "Application of hydrides in hydrogen storage and compression: Achievements, outlook and perspectives" *International Journal of Hydrogen Energy,* 2019, pp. 1-29.
Johnson, T. et al. "Metal Hydride Compression" 2019 Annual Progress Report for the DOE Hydrogen and Fuel Cells Program, Apr. 2020, pp. 704-711.
National Renewable Energy Laboratory, FY 2019 Annual Progress Report for the DOE Hydrogen and Fuel Cells Program, Apr. 2020, pp. 1-993.
Zuttel, A. et al. "Hydrogen as a Future Energy Carrier" *WILEY-VCH Verlag GmbH & Co. KGaA,* 2008, pp. 1-4.

\* cited by examiner

AB2 TYPE-BASED HYDROGEN STORAGE ALLOYS, METHODS OF PREPARATION AND USES THEREOF

CROSS-REFERENCE TO RELATED APPLICATION

This application is the U.S. national stage application of International Patent Application No. PCT/EP2022/071620, filed Aug. 2, 2022.

FIELD OF THE INVENTION

This invention relates to metal hydrides for storing gaseous hydrogen, in particular AB2 based metal hydrides, methods of production and application thereof.

BACKGROUND OF THE INVENTION

Hydrogen storage is a key step in the decarbonisation of fossil fuel technologies by renewable energy. A variety of storage methods including pressurized gas, hydrogen liquefaction and absorption in solid materials have been considered.

Hydride storage uses the reaction with hydrogen. This method to store hydrogen is also known as 'chemical hydrogen storage' and is based on the formation by the hydrogen of an interstitial compound with elemental metals such as palladium, magnesium, and lanthanum, intermetallic compounds, light metals like aluminium, or some alloys. Metal hydrides dissociate molecular hydrogen into atoms on their surface and store them in the metallic lattice, thereby producing heat. Conversely, when hydrogen is released from a hydride, heat is absorbed. These hydrides can absorb large volumes of gas, with palladium, for example, able to absorb volumes of hydrogen 900 times that of its own. The process proceeds as follows: a) absorption: Hydrogen gas molecules ($H_2$) stick to the metal surface and is then dissociated at the surface before absorption, breaking down into hydrogen atoms (H). The hydrogen atoms then penetrate into the interior of the metal crystal to form a new solid substance called a "metal hydride". The metal atoms are usually stretched apart to accommodate the hydrogen atoms. The physical arrangement (structure) of the metal atoms may also change to form a hydride; b) desorption: Hydrogen atoms migrate to the surface of the metal hydride, combine into hydrogen molecules $H_2$ and flow away as hydrogen gas. The metal atoms contract to form the original metal crystal structure.

The thermodynamic aspects of hydride formation from gaseous hydrogen are described by pressure—composition isotherms as illustrated in FIG. 1A which show typical desorption isotherms of $H_2$ in AB2-type metal hydrides (U.S. Pat. No. 4,228,145) at different temperatures. The hydrogen absorption reaction in the material is typically exothermic (producing heat) whereas the hydrogen desorption reaction is conversely endothermic (absorbing heat). The low pressure and thermodynamics of metal hydride systems increase the level of safety of the system: in case of a container failure, the hydrogen will be released slowly, the process being thermally limited by the endothermic desorption reaction. Typically, good $H_2$ storage capacities are considered to be more than 1.6 wt %.

Various metal alloys and intermetallics react with hydrogen, forming metal hydrides. By controlling temperature and pressure appropriately, the direction of the chemical reaction can be adjusted. Typical metal hydrides are in the form of powders whose particles are only a few millionths of a meter (micrometers) across.

Metal hydride storage systems are thus safe, reliable and compact in comparison to compressed gas or liquefied $H_2$ storage systems. Further, they require minimal maintenance and have a long lifetime. Metal hydrides are therefore of high interest for the storage of hydrogen under low pressures as many metals and alloys are capable of reversibly absorbing significant amounts of hydrogen, whereby a high volumetric density of up $150\ kgH_2/m^3$ is reachable and have been the subject of many recent developments (Bellosta von Colbe et al., 2019, *International Journal of Hydrogen Energy*, 44, 7780-7808).

Metals belonging to groups IIA to VA in the Periodic Table readily combine with hydrogen to form metal hydrides. In particular, alloys of type AB2 are those where metal A is Ti or Zr, and metal B is third transition one. Ti/Zr-based AB2 type alloys are considered as a promising candidate for high capacity, efficient hydrogen storage. They have proper hydrogen desorption equilibrium pressure at room temperature. The low hysteresis and remarkable thermal dynamics characteristics of AB2 materials also make them suitable to work as a compression media and compress hydrogen to 20 MPa and even to 100 MPa (Johnson et al., 2019, *Annual Progress Report for the US Department of Energy Hydrogen and Fuel Cells Program*). However, there are currently still some problems before the large-scale application of the AB2 alloy, in particular due to high absorb/desorb plateau slope with large hysteresis which is due to large internal lattice stress and uneven distribution of elements. For example, US 2004/020642 claimed a $Ti_{Q-X}Zr_XMn_{Z-Y}A_Y$ alloy and as it can be seen of FIG. 1B, the slope of the dehydrogenation plateau of the alloy at different temperatures are both very large: there is basically no flat plateau in the pressure—composition (PCT) curves. CN1789455 describes a $Ti_xZr_yMn_zCr_uA_w$ alloy for compression applications with a much flatter plateau absorption/desorption pressure. However, as can be seen from the PCT curve shown in FIG. 1C, the hysteresis is still quite large. The capacity of the alloy is low at room temperature (<1.4 wt %), and its reversibility is not satisfactory: around 0.25 wt % of $H_2$ cannot be released from the alloy during the desorption process.

Different types of hydrogen storage materials were synthesized, screened and evaluated at laboratory scale (e.g. Mg-based and AB2/AB5 types) but just a few of them were chosen to develop full-scale tank system for the following reasons.

AB2-type of alloys present high production cost since it is mandatory to avoid the reaction between the melt of the alloy and the crucible during the melting process and it is therefore required a special water-cooled copper crucible or non-contact melting processes followed by a heat treatment process. These methods could produce good AB2 alloys, but require expensive facilities, which will remarkably increase the production cost and reduce the production efficiency. For example, in CN100335665, a magnetic levitation high frequency furnace is used to produce a $Ti_aV_bCr_cMn_d$ $Me_{100-a-b-c-d}$ alloys. This method is only applicable to small amounts of alloy. Further, this method usually takes several cycles of melting in order to make the alloy homogeneous.

Further, some composite alloys have been developed for static hydrogen compression and were prepared by mixing two different types of alloys so that it contains two phases (AB5 and AB2) (CN109609791) as shown on FIG. 3C. The second phase alloy (AB5 type) is used to activate the first phase alloy (AB2 type), first alloy component being $Ti_{0.5}Zr_{0.5}(Fe_{0.1}Cr_{0.3}Mn_{0.1})_2$.

Finally, most of the currently existing AB2 type alloys are easy to be "poisoned" by impurities contained in the hydrogen and cause serious capacity degradation during the cycling.

Therefore, there is a strong requirement for developing AB2 materials useful for combined hydrogen storage and compression applications.

SUMMARY OF THE INVENTION

It is an object of the present invention to provide an alloy of AB2 type of that is suitable for hydrogen storage for combined hydrogen storage and compression applications.

It is advantageous to provide an alloy of AB2 type with improved hydrogen storage reversibility/desorption efficiency (e.g. more than 99% of hydrogen released).

It is advantageous to provide an alloy of AB2 type with high compression pressure output (>700 bat at around 100° C.).

It is advantageous to provide an alloy of AB2 type presenting long-cycle life with relatively small hysteresis (<5 bar).

It is advantageous to provide an alloy of AB2 type which keeps a good overall capacity (e.g. >1.6% at room temperature).

It is advantageous to provide an alloy of AB2 type which is resistant to contamination during production and could be easily activated at moderate hydrogen pressure (usually <5 MPa) at room temperature.

It is advantageous to provide an alloy of AB2 type which is resistant to pollutant poisoning and which can be easily regenerated after use, thereby extending the alloy's life and reduces the application costs.

Objects of this invention have been achieved by providing a hydrogen storage alloy having an AB2 type structure, its A site contains Ti and Zr, and its B site contains Cr, Mn, Fe, Ni and Re elements, represented by the general Formula (I)

$$Ti_xZr_yCr_aMn_bFe_cNi_dCu_eV_fRe_g \quad (I)$$

in which x, y, a, b, c and d are molar ratios Re is selected from La and Ce; $0.2 \leq x \leq 0.95$; $0.05 \leq y \leq 0.45$; $0.001 \leq a \leq 1$; $0.3 \leq b \leq 2$; $0.01 \leq c \leq 0.06$; $0.005 \leq d \leq 1.5$; $0 \leq e \leq 0.1$; $0 \leq f \leq 0.5$; $0.01 \leq g \leq 0.05$; $a+b+c+d+e+f+g=1.9-2.3$, a powder thereof and use thereof for storing hydrogen.

Objects of this invention have been achieved by providing a method of preparing a AB2 metal hydride alloy as disclosed herein.

Objects of this invention have been achieved by providing a hydrogen storage system comprising an alloy as disclosed herein or a powder thereof.

Disclosed herein is a hydrogen storage alloy having an AB2 type crystal structure, its A site contains Ti and Zr, and its B site contains Cr, Mn, Fe, Ni and R elements, represented by the general Formula (I)

$$Ti_xZr_yCr_aMn_bFe_cNi_dCu_eV_fR_g \quad (I)$$

in which x, y, a, b, c and d are molar ratios; R is selected from La and Ce; $0.2 \leq x \leq 0.95$; $0.05 \leq y \leq 0.45$; $0.001 \leq a \leq 1$; $0.3 \leq b \leq 2$; $0.01 \leq c \leq 0.6$; $0.005 \leq d \leq 1.5$; $0 \leq e \leq 0.1$; $0 \leq f \leq 0.5$; $0.01 \leq g \leq 0.05$; $(a+b+c+d+e+f+g)/(x+y)=1.9-2.35$.

Further disclosed herein is a method for the preparation of hydrogen storage alloy having an AB2 type crystal structure by rapid melt solidification by spinning roller quenching, wherein said method comprises the steps of:

Providing a melt of all the metal elements in a furnace under a controlled inert atmosphere (e.g. Argon or Helium) at a pressure from about 30 KPa to about 70 KPa;

Casting the melt within said furnace onto a spinning roller rolling at a speed from about 1 m/s to about 9 m/s where the melt rapidly solidifies and breaks into flakes when entering into a cooling unit (e.g. water-cooled collector);

Leaving the flakes to further cool down to a temperature below 50° C.;

Filling the furnace with air and collecting the obtained flakes.

Further disclosed herein is a hydrogen storage system comprising an alloy of AB2 type according to the invention.

Further objects and advantageous aspects of the invention will be apparent from the claims, and from the following detailed description and accompanying figures.

BRIEF DESCRIPTION OF THE DRAWINGS

The invention will now be described with reference to the accompanying drawings, which by way of example illustrate embodiments of the present invention and in which.

DETAILED DESCRIPTION OF EMBODIMENTS OF THE INVENTION

Figure 1A:
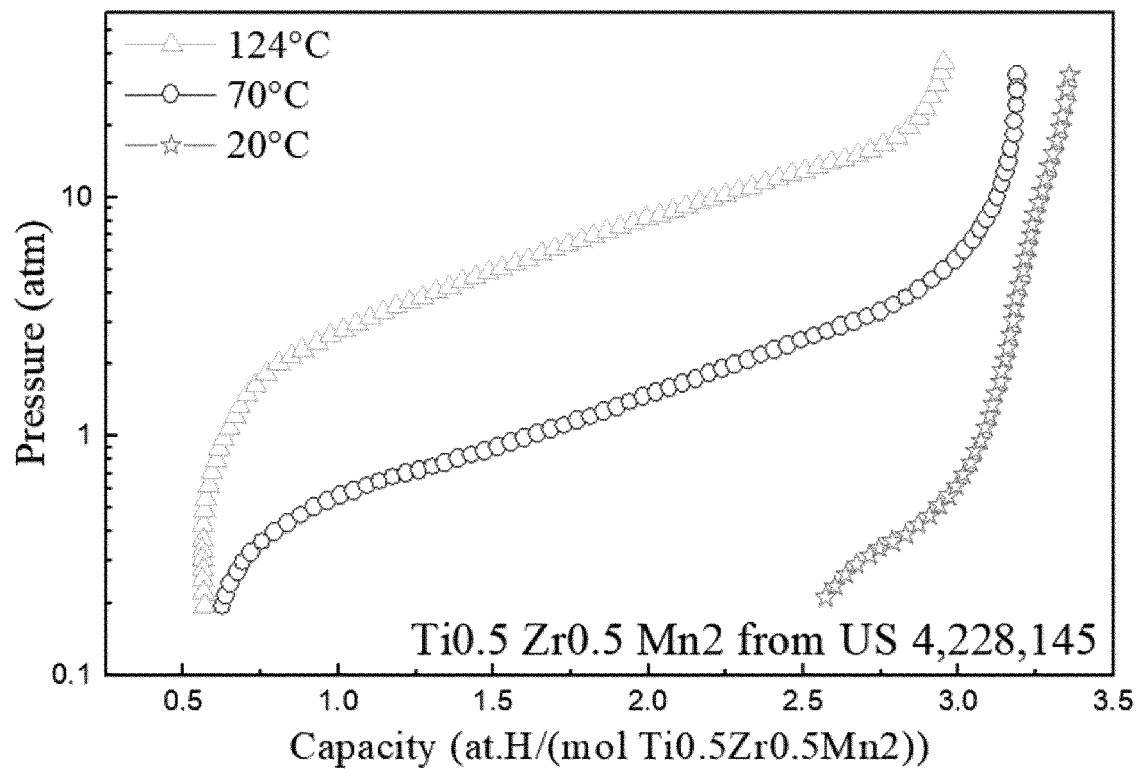
FIG. 1 represents pressure—composition—temperature (PCT) isotherms of a metal hydride. A: schematic graphical representations of typical AB2 metal hydrides useful for hydrogen storage (U.S. Pat. No. 4,228,145); B: pcT curve of the material described in US 2004/0206424; C: pcT 10 curve of the material described in CN 1789455
Figure 1B:
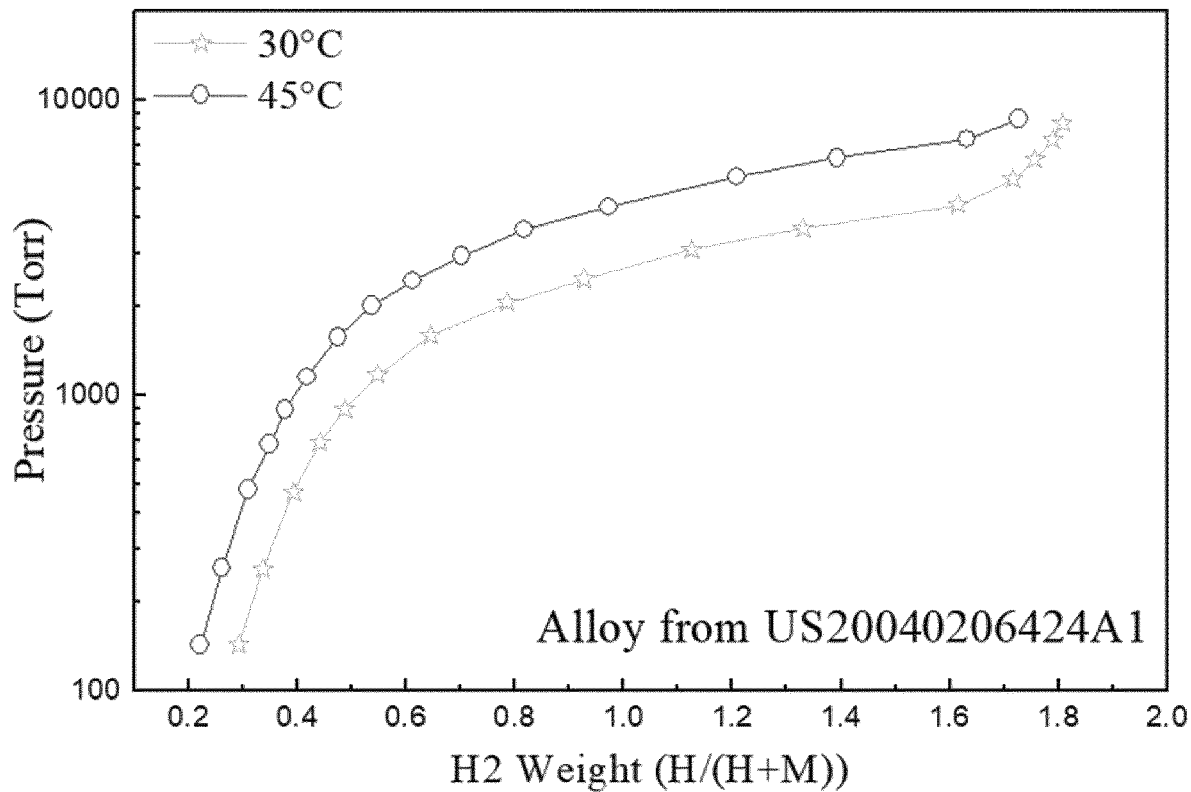
Figure 1C:
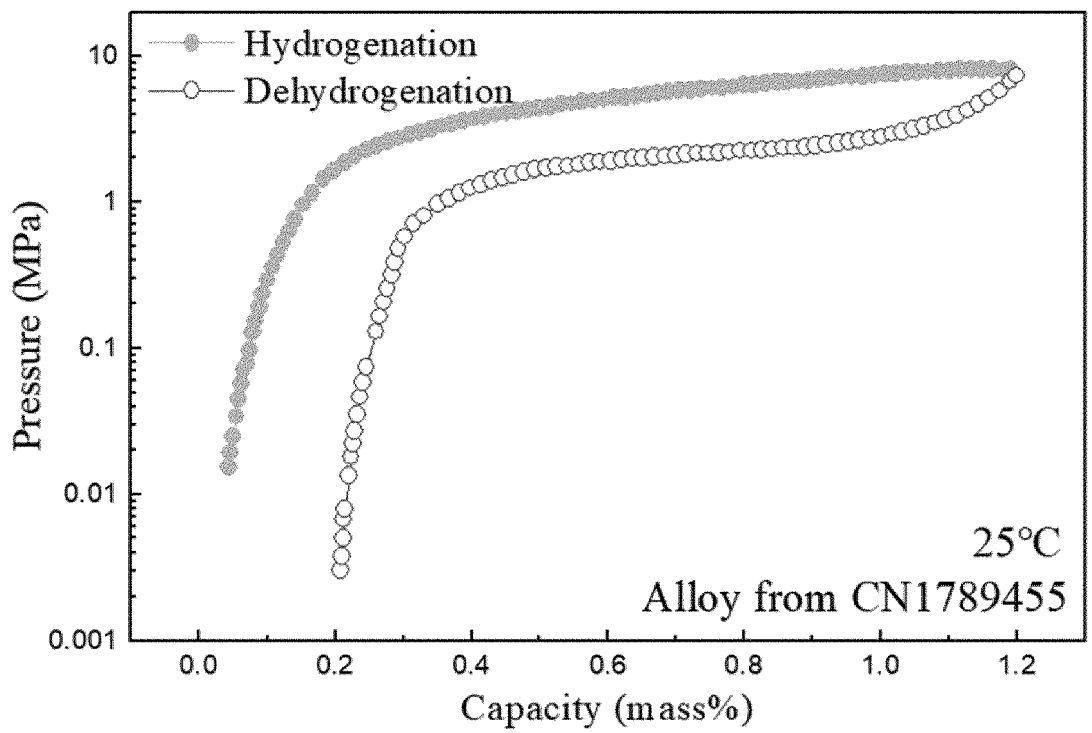

In the present invention, the hydrogen storage alloy has at 25° C. a hydrogen absorption plateau between 10-150 bar and a desorption plateau between 8-145 bar.

In the present invention, the hydrogen storage alloy has at 20° C. a hydrogen storage capacity of about 1.45 to about 1.80 wt % (typically from about 1.50 to about 1.65 wt %).

According to a particular embodiment, is provided a AB2 type alloy with single phase microstructure.

According to a particular embodiment, is provided a hydrogen storage alloy according to claim 1, wherein said alloy is selected from the following group:

$Ti_{0.65}Zr_{0.35}Cr_{0.6}Mn_{1.15}Ni_{0.1}Cu_{0.1}La_{0.05}$ (5);
$Ti_{0.2}Zr_{0.4}Cr_{0.6}Mn_{0.3}Fe_{0.05}Ni_{0.14}La_{0.05}$ (1);
$Ti_{0.7}Zr_{0.1}Cr_{0.9}Mn_{0.8}Fe_{0.5}Ni_{0.05}Cu_{0.1}Ce_{0.05}$ (2);
$Ti_{0.85}Zr_{0.15}Cr_{0.05}Mn_1Fe_{0.1}Ni_{0.45}V0.4La_{0.05}$ (3); and
$Ti_{0.95}Zr_{0.05}Cr_{0.2}Mn_{0.8}Fe_{0.3}Ni_1Ce_{0.05}$ (4).

A hydrogen storage alloy according to the invention can be prepared by typical methods used for AB2 alloys such as described in CN1602366.

Typically, for batches up to 300 kg, raw materials of each required metal elements are placed in a water-cooled copper crucible in an Arc melting furnace and the furnace is put under vacuum (e.g. $5*10^{-3}$ Pa (PABS)) and then filled with a controlled atmosphere (e.g. Ar, >99.99%) under a pressure from about 30K Pa to about 70 KPa (e.g. 50 kPa (PABS)). The raw materials are melted and kept at a melting temperature for about 5 to 10 min and then the melted mixture is let solidified and the solidified alloy (ingot) is turned upside down and melted again and the operation is repeated few times (e.g. 3 to 6 times, such as 5 times) in order to achieve an homogeneous composition of the resulting alloy. Once the last cycle is over and the temperature of the solidified alloy is below 50° C., the furnace is put in communication with air and the ingot alloy is collected.

For batches from 3 to about 1,000 kg, a method for the preparation of hydrogen storage alloy having an AB2 type crystal structure by rapid melt solidification by spinning roller quenching has described herein is advantageously used. In particular, compared with Arc-melting processes, the alloy prepared by this method has a more homogenous composition, stable crystal structure, less phases other than AB5 structure and lower crystal strain (thus with a smaller hysteresis and more flat plateau pressure). The alloy does need to undergo heat-treatment process before usage, while maintain a long cycle life. This method is also suitable for large scale production and remarkably reduces production cost.

According to a particular embodiment, the metal elements are melted in a furnace initially purged and put under vacuum (e.g. $5*10^{-3}$ Pa (PABS)) and then filled with a controlled inert atmosphere (e.g. Argon or Helium>99.99%)) at a pressure from about 30 KPa to about 70 KPa (e.g. 50 kPa (PABS)).

According to a further particular embodiment, the metal elements are melted in a $Al_2O_3$-based crucible placed in the furnace.

According to a further particular embodiment, the metal elements are melted in a crucible at a temperature from about 1,850 and 2,150° ° C. placed in a furnace.

According to a further particular embodiment, after all the metals are melted, the temperature is reduced to a temperature between about 1,750 and 1,850° C. and hold for about 5 to 10 min.

Figure 4:
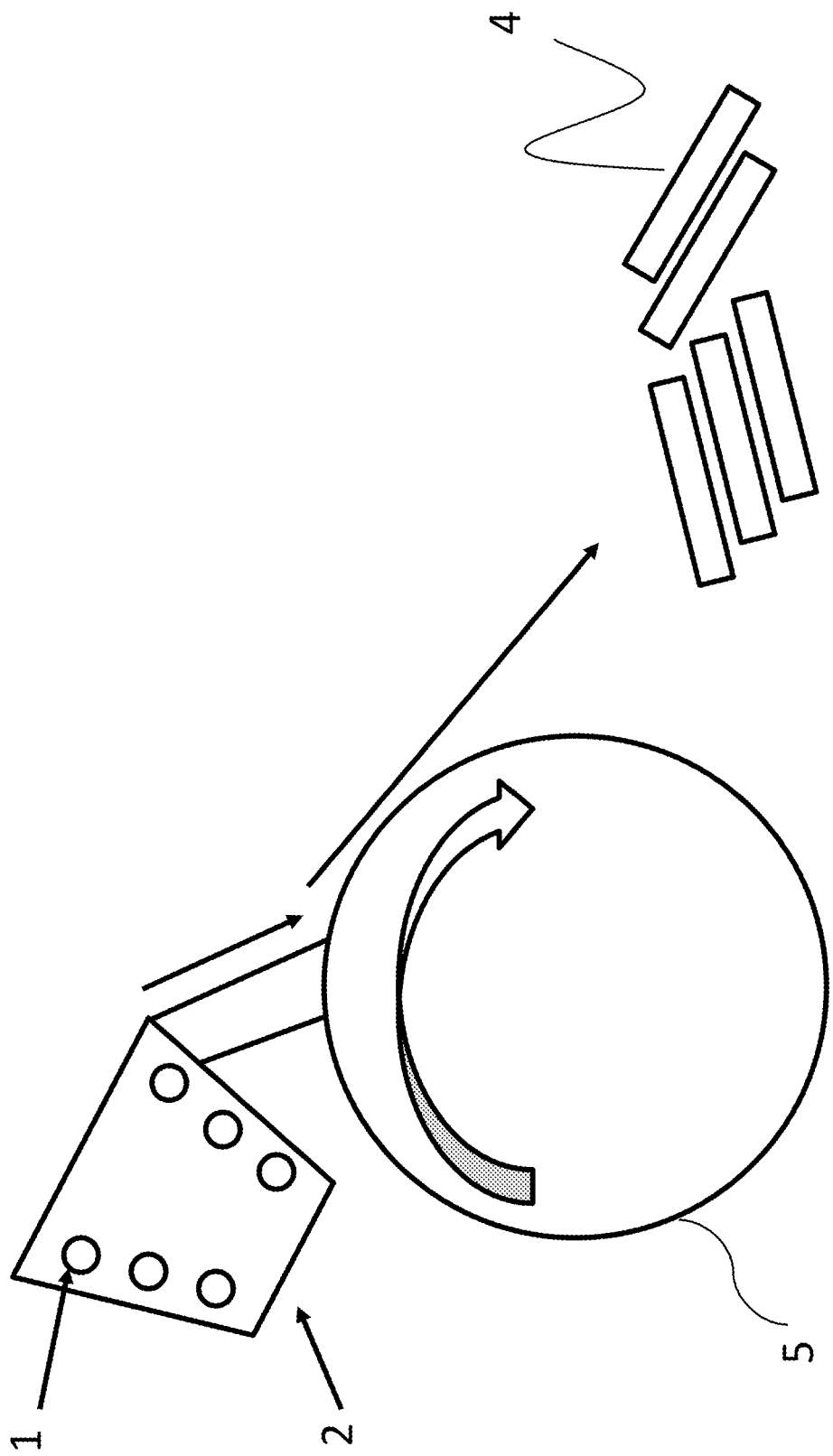
FIG. 4 is a schematic representation of a method of preparation of an alloy of the invention by rapid melt solidification by spinning roller quenching.

Referring to FIG. 4, the metal mixture is melted in a crucible 1 (e.g. heated by an induction coil 2) placed in the furnace in said controlled atmosphere and then casted onto a spinning roller 3 (e.g. copper roller) rolling at a constant speed where the melt rapidly solidifies and breaks into flakes 4 when entering into a cooling unit (e.g. water-cooled collector).

According to a further particular embodiment, the melted mixture is casted onto a spinning roller (e.g. copper roller) rolling at a constant speed from about 1 to about 9 m/s where the melt rapidly solidifies and breaks into flakes. The thickness of the flakes will depend on the roller speed, the lower the speed, the thicker the flakes. According to a particular aspect, the thickness of the flakes typically ranges from 0.1-0.6 mm.

According to a further particular embodiment, the flakes are left to cool down in the furnace at a temperature in a water-cooled chamber.

The alloy of the invention could be used directly from the obtained flakes or can undergo a heat-treatment below the melting temperature of the alloy, when needed. The heat treatment is applied to further reduce the hysteresis and improve the cycle performance. Typically, a heat treatment is carried out in a furnace under vacuum (e.g. $9*10^{-2}$ Pa (PABS)), wherein the temperature is raised up to about 200° ° C. and hold to this temperature for about 20 min. Before further increasing the temperature of the furnace, it is filled with an inert atmosphere (e.g. pure Argon (>99.99%)) at a pressure from about 30 KPa to about 70 KPa (e.g. to the pressure of 50 KPa (PABS)). The temperature of the furnace is then increased to a temperature between about 850 and 1,150° C. which is hold for about 0.5 to about 72 h. The temperature-treated alloy is then cooled down at a rate of about 5 to about 20 K/min. Once the temperature of the alloy is below 60° C., the furnace is put in communication with air and the alloy is collected.

According to a further embodiment, is provided a method for the preparation of hydrogen storage alloy having an AB2 type crystal structure by rapid melt solidification by spinning roller quenching, wherein said method further comprises a heat treatment step.

The alloy according to the invention (heat-treated or not) can be used in the form of a powder. In particular, the obtained alloys are then crunched into a powder by mechanical or jet milling under the inert gas (e.g. $N_2$ or Ar, Ar preferred). Typically, the particle size of the alloy could be from about 0.5 mm to about 3 mm, depending on the hydrogen storage system it will be used for.

The alloy powder can be then stored as a powder under vacuum or inert gas (e.g. $N_2$ or Ar, Ar preferred).

Alloys powder can be then used in a hydrogen storage system as described in Bellosta von Colbe et al., 2019, supra.

Examples illustrating the invention will be described hereinafter in a more detailed manner and by reference to the embodiments represented in the Figures.

EXAMPLES

Example 1: Preparation of Alloys According to the Invention

An alloy of the invention was prepared as follows.

The required amount of the metals is weighted according to the Formula (I) in a total weight of 450 kg and placed in a $Al_2O_3$-based crucible in an industrial induction melting furnace. The furnace is evacuated until the vacuum reached $5*10^{-3}$ Pa (PABS), then filled with Helium (>99.99%) to the pressure of 50 KPa (PABS). The metals are heated up to 1850° C. and then melted. After all metals are melted, the temperature was reduced to 1,550° C. and held for 10 min. The melt was cast onto a spinning Cu roller, the speed of which was set to be 3 m/s, the thickness of the flake is around 0.3 mm. The solidified flake will be led to a water-cooled chamber for further cool down. The furnace was refilled with air and the flake was taken out when the temperature of the flake drop below 50° C. The alloy could be used without further treatment.

Various examples of alloys of the invention are presented in Table 1 below together with their hydrogen storage performance.

TABLE 1

| | A Side (molar ratio) | | B Side (molar ratio) | | | | | | | | AB | Hydrogen Storage Pressure at room temperature (atm) |
|---|---|---|---|---|---|---|---|---|---|---|---|---|
| | Ti | Zr | Cr | Mn | Fe | Ni | Cu | V | La | Ce | | |
| 1 | 0.2 | 0.4 | 0.6 | 0.3 | 0.05 | 0.14 | 0 | 0 | 0.05 | 0 | 1.9 | 15 |
| 2 | 0.7 | 0.1 | 0.9 | 0.8 | 0.5 | 0.05 | 0.1 | 0 | 0 | 0.05 | 2 | 35 |
| 3 | 0.85 | 0.15 | 0.05 | 1 | 0.1 | 0.45 | 0 | 0.4 | 0.05 | 0 | 2.05 | 73 |
| 4 | 0.95 | 0.05 | 0.2 | 0.8 | 0.3 | 1 | 0 | 0 | 0 | 0.05 | 2.3 | 120 |

Example 2: Hydrogen Storage Capacity of Alloys of the Invention

The $H_2$ storage performance of the alloy prepared under Example 1 has been tested as follows. 3 g of alloy ingot/flake was broken into powder (size <100 mesh) and loaded into a stainless cylindrical sample chamber. The alloy was charged with constant 5 MPa of hydrogen pressure for 2 hours. After that the sample was evacuated for 30 min. The charging-evacuation step was repeated at least 3 times, in order to fully activate the alloy.

A fully-automatic, and computer-controlled volumetric apparatus (known as Sievert's apparatus, or PCT apparatus) will be used to measure the amount of hydrogen absorbed by the alloy at 25° C. in water bath.

Figure 2A:
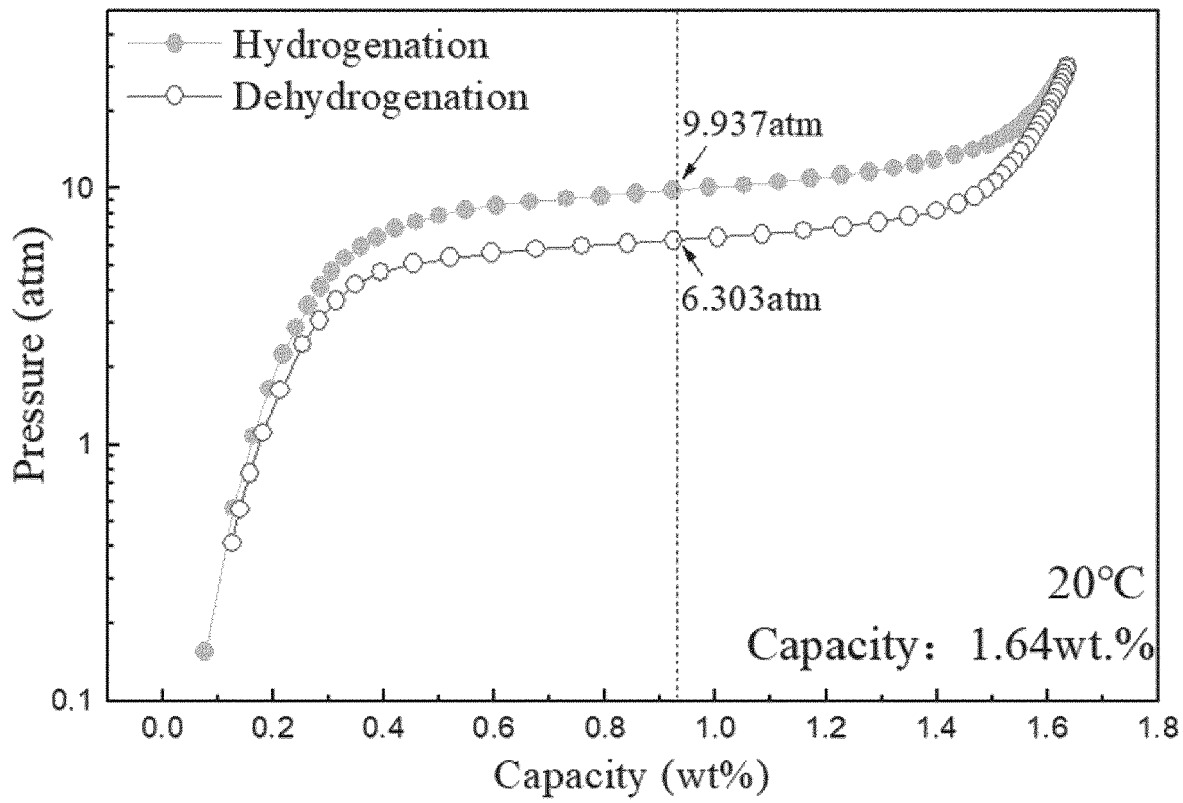
FIG. 2 represents pressure—composition—temperature (PCT) isotherms of a metal hydride according to the invention as described in Example 2. A: AB2-type alloy suitable for safety large-scale hydrogen storage at relative low pressure; B & C: AB2-type alloy suitable for high pressure hydrogen compression at different temperatures.
Figure 2B:
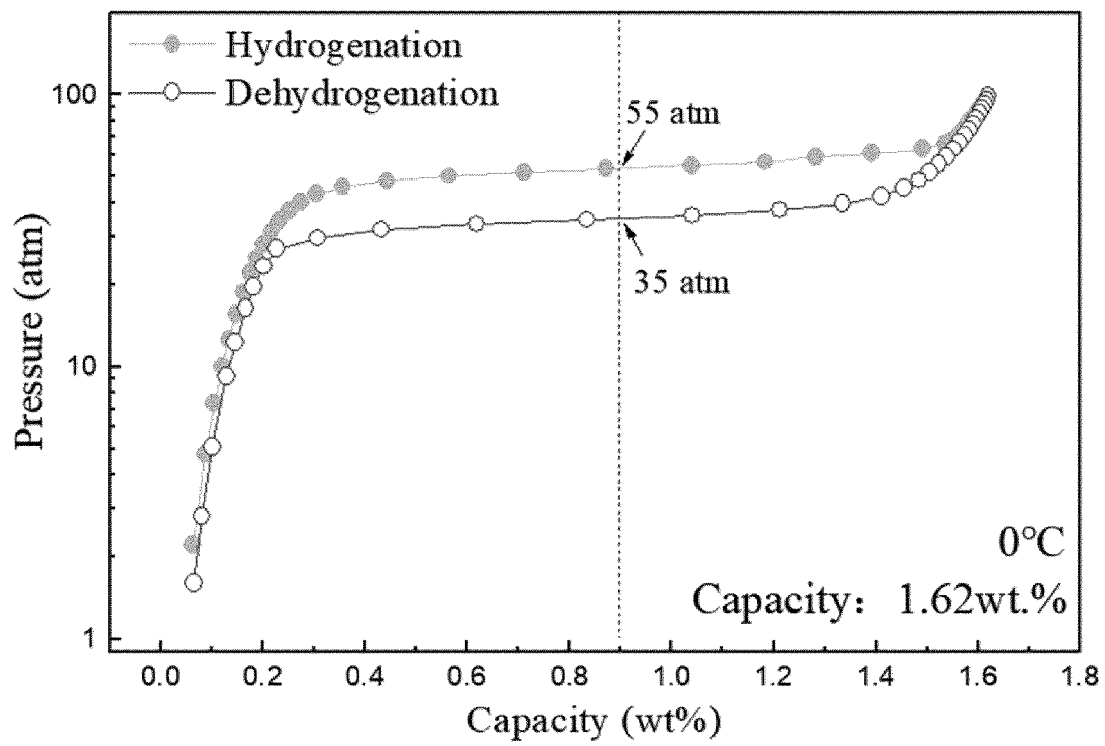
Figure 2C:
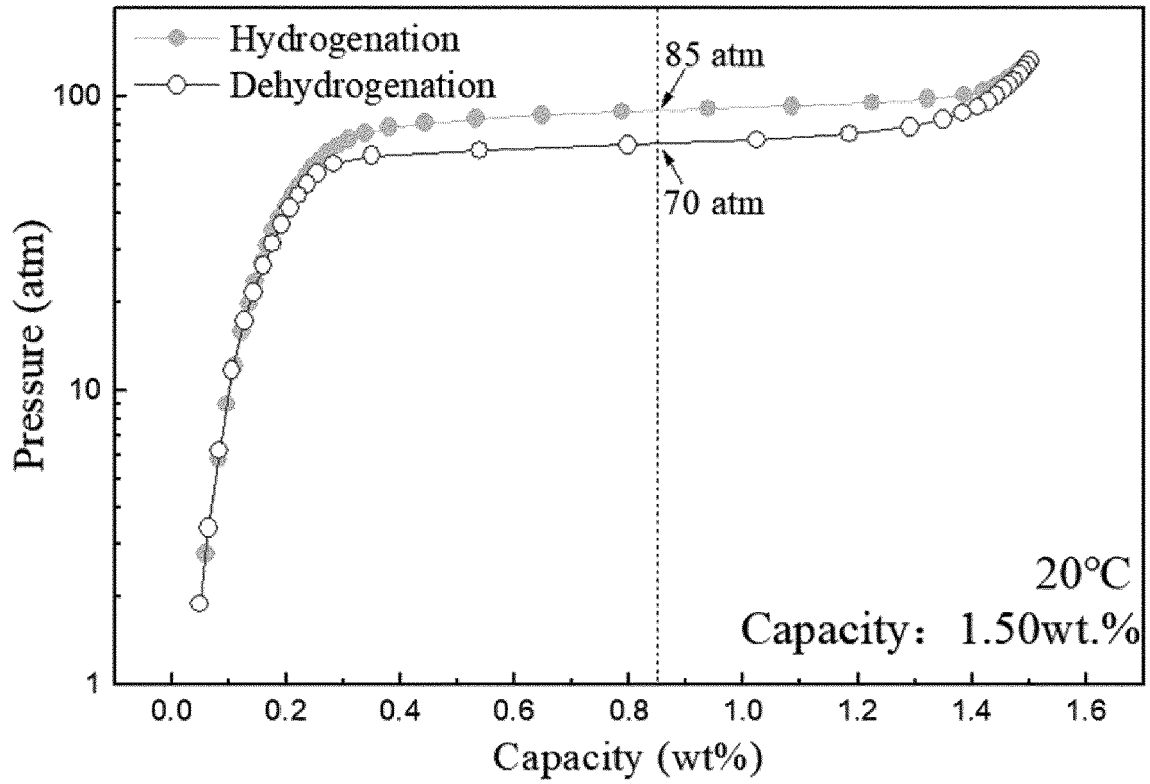

As can be seen under FIG. 2, the alloys of the invention have a much higher and wider desorption plateau than the conventional AB2 alloys. The AB2 alloy used for large-scale hydrogen storage as shown in FIG. 2A shows a suitable plateau pressure at room temperature. The hysteresis and the slope of the plateau of both the charging and discharging are both much smaller than the conventional AB2 alloys. The PCT curves for compression at different temperatures (B and C) show that the pressure increases fast with an increase of temperature and the hysteresis remain small at high pressure output.

Example 3: Activation Ability of Single-Phase Alloy of the Invention

The ability of the alloy of the invention $Ti_{0.65}Zr_{0.35}Cr_{0.6}Mn_{1.15}Ni_{0.1}Cu_{0.1}La_{0.05}$ (5) to be easily activated at moderate hydrogen pressure has been assessed as follows and compared to the two-phase alloy from 1 Example of CN109609791 when x=0.1 ($Ti_{0.5}Zr_{0.5}Fe_{0.2}Cr_{0.6}Mn_{0.2}La_{0.1}Ni_{0.1}Mn_{0.05}$) by comparing the pcT curves for the two alloys as described under Example 2 and the activation times (Time needed to start absorption of $H_2$). The two-phase nature of the alloy of CN109609791 is shown by X-ray diffraction at room temperature and atmosphere on FIG. 3C, as compared to the above alloy of the invention (5) and $LaNi_5$ (AB5 structure).

Figure 3A:
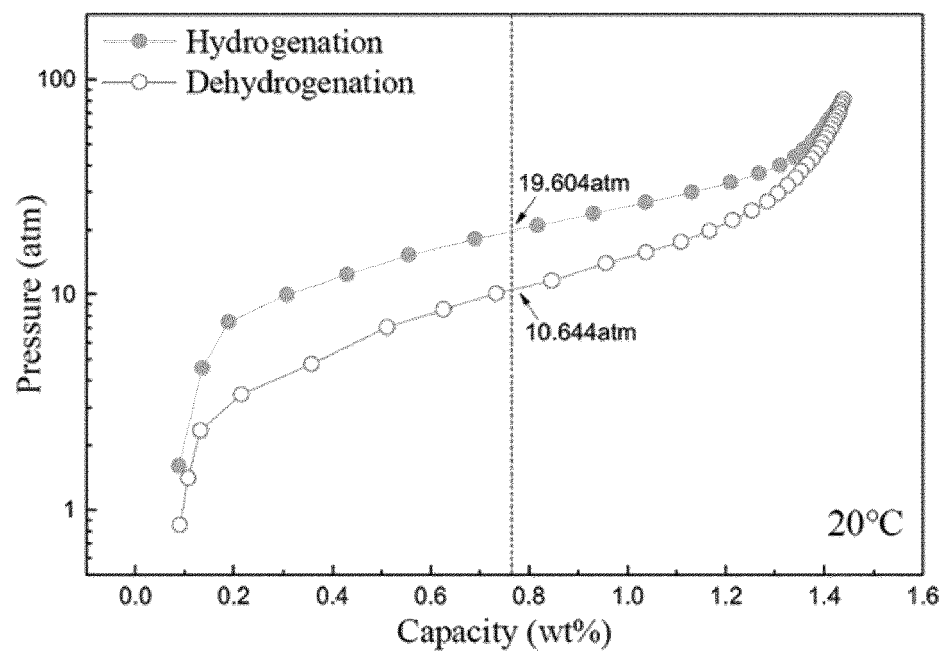
FIG. 3 represents pressure—composition—temperature (PCT) isotherms of a metal hydride according to the invention (B) as compared to a two-phase alloy described in CN109609791 (A) as described in Example 3 and (C) X-ray diffraction spectrum of the "first alloy" described in CN109609791 (C1) compared to the alloy of Example 3 (1) and LaNi5 (AB5 structure).
Figure 3B:
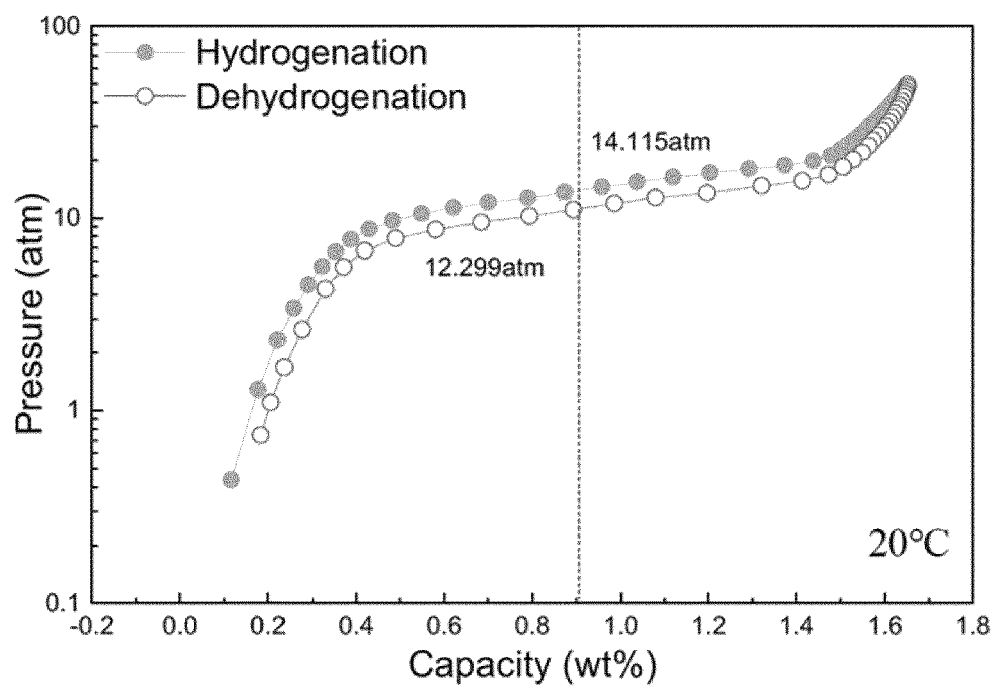
Figure 3C:
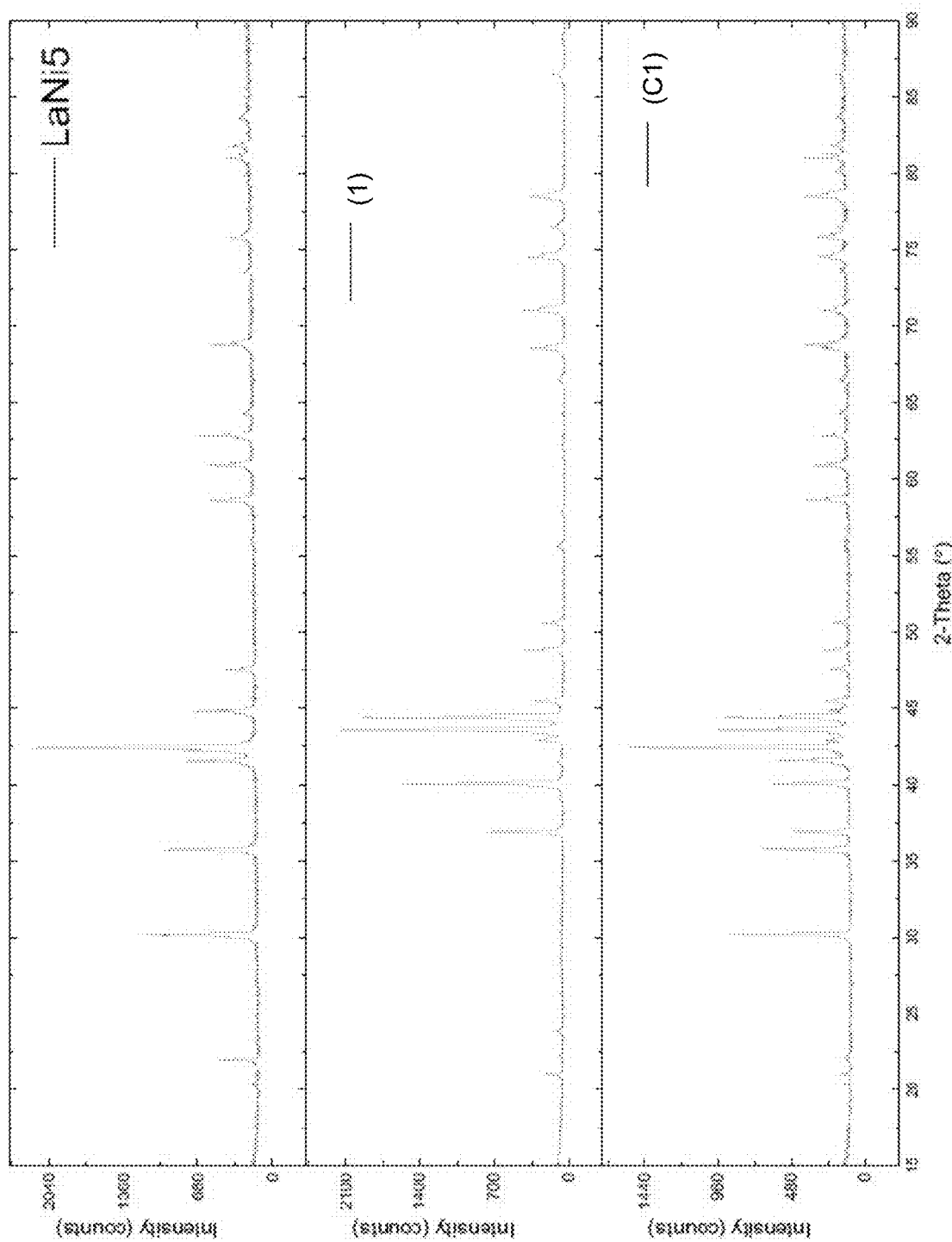

As can be seen on FIG. 3, the alloys of the invention present both a hysteresis and a slope of plateau of both the charging and discharging much smaller than the two-phase alloy at room temperature.

Further, as can be seen in Table2 below, the activation time of the alloy of the invention is nearly immediate after exposing the alloy under a pressure of $H_2$ of 35 bar, while for the comparative alloy, it takes 80 s to initiate the absorption at a pressure above 80 bar $H_2$.

TABLE 2

| Alloy | Initial Hydrogen Pressure (bar) | Time needed to start absorption of $H_2$ (s) |
|---|---|---|
| $Ti_{0.65}Zr_{0.35}Cr_{0.6}Mn_{1.15}Ni_{0.1}Cu_{0.1}La_{0.05}$ (from the invention) | 35 | 15 |
| $Ti_{0.5}Zr_{0.5}Fe_{0.2}Cr_{0.6}Mn_{0.2}La_{0.1}Ni_{0.1}Mn_{0.05}$ Comparative alloy | 80 | 80 |

Therefore, those data support that the alloys of the invention are more efficient for $H_2$ storage even at lower pressure of $H_2$ than the comparative alloy which relies on the presence of a second phase (AB5 alloy) to help to activate the AB2 alloy.

The invention claimed is:

1. A hydrogen storage alloy consisting of single-phase alloy with an AB2 type crystal structure, wherein its A site consists of Ti and Zr, and its B site contains Cr, Mn, Fe, Ni and R elements, represented by the general Formula (I)

$$Ti_xZr_yCr_aMn_bFe_cNi_dCu_eV_fR_g \quad (I)$$

in which x, y, a, b, c and d are molar ratios; R is selected from La and Ce; $0.2 \leq x \leq 0.95$; $0.05 \leq y \leq 0.45$; $0.001 \leq a \leq 1$; $0.3 \leq b \leq 2$; $0.01 \leq c \leq 0.6$; $0.005 \leq d \leq 1.5$; $0 \leq e \leq 0.1$; $0 \leq f \leq 0.5$; $0.01 \leq g \leq 0.05$; $(a+b+c+d+e+f+g)/(x+y)=1.9-2.35$.

2. The hydrogen storage alloy according to claim 1, wherein said alloy is selected from the following group:
$Ti_{0.2}Zr_{0.4}Cr_{0.6}Mn_{0.3}Fe_{0.05}Ni_{0.14}La_{0.05}$;
$Ti_{0.85}Zr_{0.15}Cr_{0.05}Mn_1Fe_{0.1}Ni_{0.45} V_{0.4}La_{0.05}$; and
$Ti_{0.95}Zr_{0.05}Cr_{0.2}Mn_{0.8}Fe_{0.3}Ni_1Ce_{0.05}$.

3. The hydrogen storage alloy according to claim 1, wherein the hydrogen storage alloy has, at 25° C., a hydrogen absorption plateau between 10-150 bar and a desorption plateau between 8-140 bar.

4. The hydrogen storage alloy according to claim 1, wherein the hydrogen storage alloy has, at 25° C., a hydrogen storage capacity of about 1.45 to about 1.80 wt %.

5. The hydrogen storage alloy according to claim 4, wherein the hydrogen storage alloy has, at 25° C., a hydrogen storage capacity of about 1.50 to about 1.65 wt %.

6. A flake of an alloy according to claim 1, wherein the flake particle size of the alloy is from about 0.5 mm to about 3 mm.

7. A method of storing hydrogen comprising contacting the alloy according to claim 1 with hydrogen.

8. A hydrogen storage system comprising the alloy according to claim 1 or a powder thereof.

9. A method for preparation of the hydrogen storage alloy of claim 1, wherein said method comprises the steps of:
providing a melt of all the metal elements in the proportions of the hydrogen storage alloy, in a furnace under a controlled inert atmosphere at a pressure from about 30 KPa to about 70 KPa;

casting the melt within said furnace onto a spinning roller rolling at a speed from about 1.5 to about 9 m/s where the melt rapidly solidifies and breaks into flakes when entering a cooling unit;

leaving the flakes to further cool down to a temperature below 50° C.; and filling the furnace with air and collecting the obtained alloy flakes.

10. The method according to claim 9, wherein the obtained alloy flakes are subjected to a further temperature treatment at a temperature between about 850 and 1,150° C. for about 0.5 to about 72 h.

11. The method according to claim 9, wherein the spinning roller is a copper roller.

* * * * *